United States Patent
Senoo

(10) Patent No.: US 8,521,840 B2
(45) Date of Patent: Aug. 27, 2013

(54) NETWORK SYSTEM AND REPLAY APPARATUS

(75) Inventor: Junya Senoo, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 745 days.

(21) Appl. No.: 11/964,245

(22) Filed: Dec. 26, 2007

(65) Prior Publication Data

US 2008/0215707 A1    Sep. 4, 2008

(30) Foreign Application Priority Data

Dec. 27, 2006    (JP) .................................. 2006-352452

(51) Int. Cl.
  *G06F 15/16*    (2006.01)
(52) U.S. Cl.
  USPC .......................... 709/218; 707/104.1; 707/203
(58) Field of Classification Search
  USPC ....................................................... 709/218
  See application file for complete search history.

(56) References Cited

U.S. PATENT DOCUMENTS

| | | | | |
|---|---|---|---|---|
| 5,909,689 A | * | 6/1999 | Van Ryzin | 707/203 |
| 2006/0143236 A1 | * | 6/2006 | Wu | 707/104.1 |
| 2006/0195480 A1 | * | 8/2006 | Spiegelman et al. | 707/104.1 |

FOREIGN PATENT DOCUMENTS

| | | |
|---|---|---|
| JP | 2002-358328 A | 12/2002 |
| JP | 2003-67328 A | 3/2003 |
| JP | 2005-56343 A | 3/2005 |

OTHER PUBLICATIONS

Japanese Office Action dated Jun. 14, 2011 including English-language translation (Eight (8) pages).

* cited by examiner

*Primary Examiner* — Andrew Goldberg
(74) *Attorney, Agent, or Firm* — Crowell & Moring LLP

(57) ABSTRACT

Disclosed is a network system including a server to store a content and a plurality of replay apparatuses to receive the content transmitted from the server, the replay apparatuses being connected with the server via a network, and the replay apparatus including a list storage unit to store a predetermined content list, an obtaining unit to obtain the content list stored in the list storage unit of another replay apparatus connected via the network, and a storage control unit to store the content list obtained by the obtaining unit in the list storage unit.

4 Claims, 5 Drawing Sheets

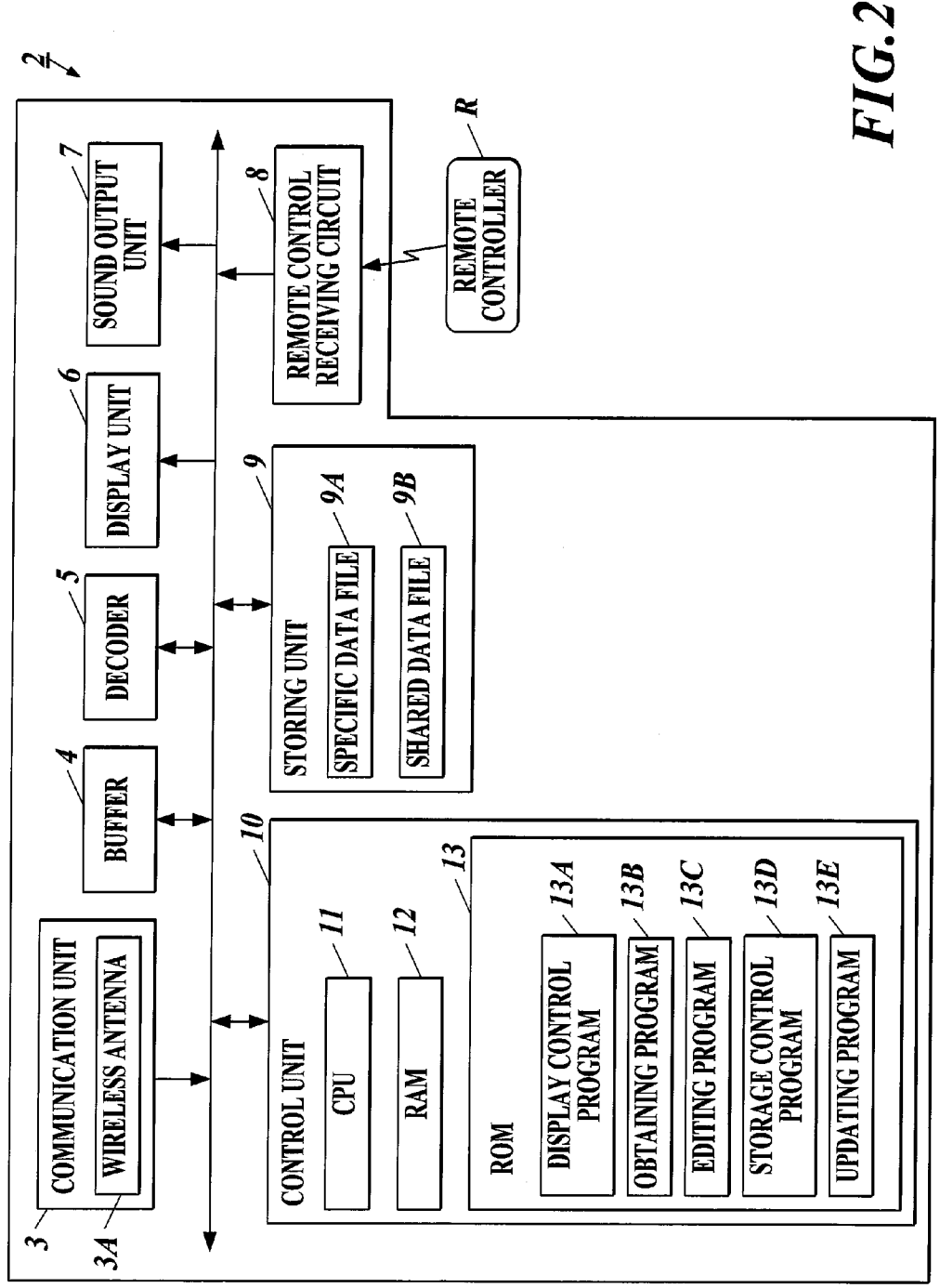

NETWORK SYSTEM AND REPLAY APPARATUS

BACKGROUND OF THE INVENTION

1. Field of the Invention

The present invention relates to a network system and a replay apparatus.

2. Description of Related Art

Conventionally, there is known a bookmark function in which the URL of the Web page on the internet is stored as a favorite list to make it easy to access the URL from the next time. Further, there is known a network system which is structured so as to share the favorite list with other client terminals by having a bookmark managing server which stores the favorite list of each client terminal provided on the internet (for example, JP2003-67328A).

Moreover, there is known a network system in which each user's favorite list is registered in the Web page on the internet and the desired web page can be accessed by selecting the URL of the desired Web page by referring to the favorite list in the Web page (for example, JP2002-358328A).

In a home network system which is regulated by the DLNA (Digital Living Network Alliance) or the like, the DMS (Digital Media Server) which provides contents and a plurality of the DMP (Digital Media Player) which receive the contents from the DMS are connected by the home network. Further, each DMP stores the favorite list (for example, a music selection list) relating to the contents which is provided by the DMS, and receives the desired contents from the DMS based on the favorite list.

However, in the home network system, the favorite list needs to be set for each DMP when one user is using a plurality of DMP. Thus, there is a problem that the setting is a hassle. The inventions disclosed in JP2003-67328A and JP2002-358328A relate to the favorite list for referring to the Web page on the internet. Therefore, they cannot solve the above mentioned problem.

SUMMARY OF THE INVENTION

It is, therefore, a main object of the present invention to provide a network system and a replay apparatus which can generate a favorite list more efficiently.

According to a first aspect of the present invention, there is provided a network system comprising a server to store a content and a plurality of replay apparatuses to receive the content transmitted from the server, the replay apparatuses being connected with the server via a network, and the replay apparatus comprises a specific list storage unit to store a specific list which is a predetermined content list specific to the replay apparatus, a shared list storage unit to store a shared list which is a predetermined content which is shared among all of the replay apparatuses which are connected via the network, an obtaining unit to obtain the specific list stored in a specific list storage unit of another replay apparatus connected via the network, a storage control unit to store the specific list obtained by the obtaining unit in the specific list storage unit of the replay apparatus, an editing unit to carry out a predetermined editing process for the shared list stored by the shared list storage unit, and an updating unit to update the shared list storage unit based on an update list by transmitting the shared list which is edited to the another replay apparatus connected via the network as the update list and by receiving the update list from the another replay apparatus connected via the network when the shared list is edited by the editing unit.

According to a second aspect of the present invention, there is provided a replay apparatus which is connected with a server storing a content via a network and which receives the content transmitted from the server comprising a list storage unit to store a predetermined content list, an obtaining unit to obtain the content list stored in the list storage unit of another replay apparatus connected via the network, and a storage control unit to store the content list obtained by the obtaining unit in the list storage unit.

According to a third aspect of the present invention, there is provided a network system comprising a server to store a content and a plurality of replay apparatuses to receive the content transmitted from the server, the replay apparatuses being connected with the server via a network, and the replay apparatus comprises a list storage unit to store a predetermined content list, an obtaining unit to obtain the content list stored in the list storage unit of another replay apparatus connected via the network, and a storage control unit to store the content list obtained by the obtaining unit in the list storage unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2 is a block diagram showing an example of a structure of the DMP according to the present invention;

DESCRIPTION OF THE PREFERRED EMBODIMENTS

Hereinafter, the best mode to implement the network system and the replay apparatus according to the present invention will be described in detail with reference to the drawings.

Figure 1:
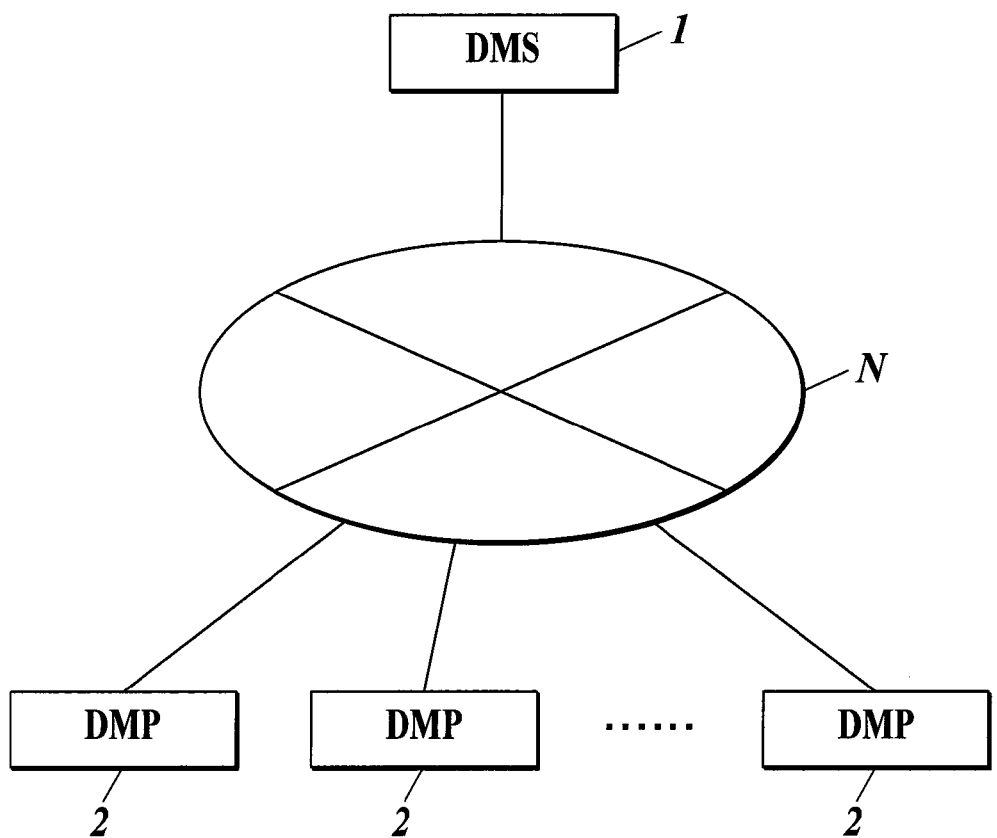
FIG. 1 is a diagram showing an example of a configuration of a network system according to the present invention.

First, the structure of the network system 100 according to the present invention will be described with reference to FIG. 1. For example, the network system 100 according to the embodiment comprises the DMS (Digital Media Server) 1 as a server to store the contents and a plurality of DMP (Digital Media Player) 2 as replay apparatuses to receive the contents sent from the DMS 1, which are connected with the DMS 1 via the network N as shown in FIG. 1.

Here, the number of the DMS 1 and the DMP 2 which are connected to the network N is not limited to the number of the DMS 1 and the DMP 2 shown in the illustrated example, and the number can be arbitrary.

For example, the network N is a network in compliance with the DLNA (Digital Living Network Alliance) standard.

Particularly, the network N is a network such as a wired LAN which complies with the Ethernet (registered trademark), a wireless LAN (Local Area Network) which complies with the Bluetooth standard, the IEEE (Institute of Electrical and Electronic Engineers) 802.11 standard or the like, and the like.

For example, as shown in FIG. 2, the DMP 2 comprises a communication unit 3, a buffer 4, a decoder 5, a display unit 6, a sound output unit 7, a remote controller receiving circuit 8, a storage unit 9, a control unit 10 and the like.

For example, the communication unit 3 carries out sending and receiving of a predetermined communication data between the DMS 1 and other DMP 2 via the network N.

Particularly, the communication unit 3 comprises a wireless antenna 3A, a mixer (omitted from the drawing) and the like for example. Further, the communication unit 3 carries out a predetermined process for the data which is transmitted from the DMS 1 by the wireless antenna 3A and outputs the processed data to the decoder 5.

Moreover, the communication unit 3 controls the wireless antenna 3A to receive the update list (after mentioned) which is transmitted from other DMP 2.

Furthermore, the communication unit 3 controls the wireless antenna 3A to transmit the update list to other DMP 2.

For example, the buffer 4 temporarily stores the contents which are transmitted from the DMS 1 and which are received by the communication unit 3.

For example, the decoder 5 decodes the contents which are transmitted from the DMS 1 according to the control signal input from the control unit 10, generates the video data and the audio data, and outputs the generated video data and audio data to the display unit 6 and the audio output unit 7.

For example, the display unit 6 comprises the LCD (Liquid Crystal Display), the PDP (Plasma Display Panel) or the like, and displays the video based on the video data which is output from the decoder 5. More in particular, the display unit 6 is controlled by the CPU 11 executing the after mentioned display control program 13A, and for example, displays the contents list display screen shown in FIG. 3A, the DMP selecting screen shown in FIG. 3B and the specific list selecting screen shown in FIG. 3C.

For example, the sound output unit 7 comprises a speaker or the like, and outputs the audio based on the audio data which is output from the decoder 5.

For example, the remote controller receiving circuit 8 outputs the operation signal which is output from the remote controller R to the CPU 11. More particularly, the remote controller receiving circuit 8 converts the infrared signal from the remote controller R into the electric signal and outputs the electric signal to the CPU 11.

For example, the remote controller R comprises various types of keys or the like to input various types of operation signals. Further, the remote controller R outputs the various types of operation signals to the CPU 11 via the remote controller receiving circuit 8 by being operated by a user.

More particularly, the remote controller R outputs the operation signal for displaying the contents list to the CPU 11, for example. Further, for example, the remote controller R outputs the operation signal for selecting the contents list, the operation signal for selecting other DMP 2 and the operation signal for selecting the specific list of other DMP 2 to the CPU 11 in the contents list display screen (FIG. 3A), the DMP selecting screen (FIG. 3B) and the specific list selecting screen (FIG. 3C).

For example, the storage unit 9 comprises a magnetic recording medium, an optical recording medium or a semiconductor memory. Further, for example, the storage unit 9 stores the specific data file 9A, the shared data file 9B and the like as shown in FIG. 2.

For example, the specific data file 9A stores the specific list which is a predetermined contents list specific to the DMP. Here, for example, the contents list is a list (favorite list) which lists the specific information of the contents desired by a user, and for example, is stored in the DIDL (Digital Item Declaration Language) format. For example, the specific information of the contents is the information which can identify each contents such as the title name, the URL (Uniform Resource Locator) or the like of the contents. The storage unit 9 functions as the specific list storage unit and the list storage unit by storing the specific data file 9A.

For example, the shared data file 9B stores the shared list which is a predetermined contents list which can be shared among the entire DMP 2 which are connected via the network N. Further, for example, the shared list is stored in the DIDL format. The storage unit 9 functions as the shared list storage unit and the list storage unit by storing the shared data file 9B.

For example, the control unit 10 comprises the CPU (Central Processing Unit) 11, the RAM (Random Access Memory) 12, the ROM (Read Only Memory) 13 and the like as shown in FIG. 2.

For example, the CPU 11 reads the processing programs and the like which are stored in the ROM 13, and controls the entire DMP 2 by expanding and executing the program and the like in the RAM 12.

The RAM 12 expands the processing programs and the like which are executed by the CPU 11 in the program storage area in the RAM 12, and stores the input data, the processing results which occur when the above processing programs are executed and the like in the data storage area.

For example, the ROM 13 stores the system program which can be executed in the DMP 2, various types of processing programs which can be executed by the system program, the data which are used when the various types of processing programs are executed, the data of the processing result which are arithmetically processed by the CPU 11 and the like. More particularly, for example, the ROM 13 stores the display control program 13A, the obtaining program 13B, the editing program 13C, the storage control program 13D, the updating program 13E and the like as shown in FIG. 2. Here, the programs are stored in the ROM 13 in the form of a program code which can be read by a computer.

For example, the display control program 13A is a program to make the CPU 11 realize the function of displaying the contents list display screen on the display unit 6 when the operation signal for displaying the contents list is input from the remote controller R.

Moreover, for example, the display control program 13A is a program to make the CPU 11 realize the function of displaying the DMP selecting screen, the specific list selecting screen and the like on the display unit 6.

Figure 3A:
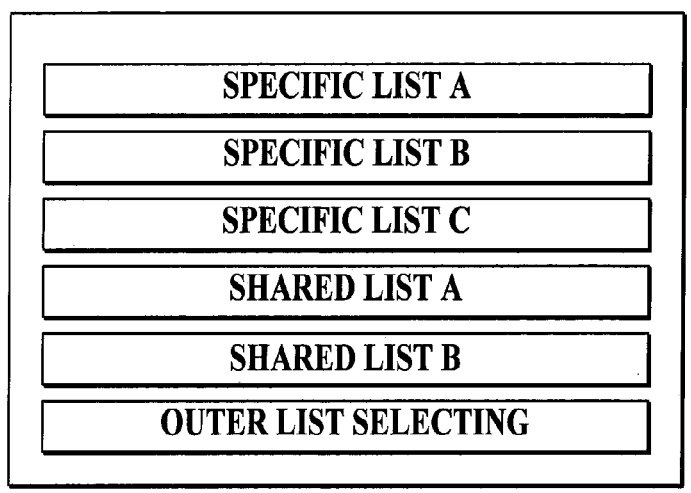
FIG. 3A is a diagram showing an example of a contents list display screen which is displayed in the DMP according to the present invention.
Figure 3B:
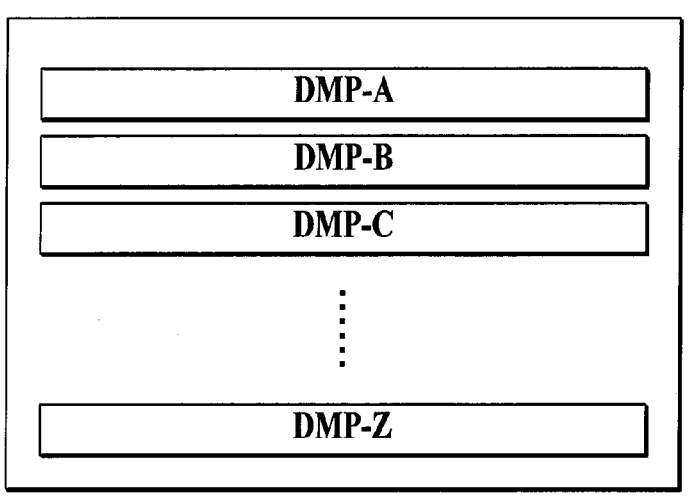
FIG. 3B is a diagram showing an example of the DMP selecting screen.
Figure 3C:
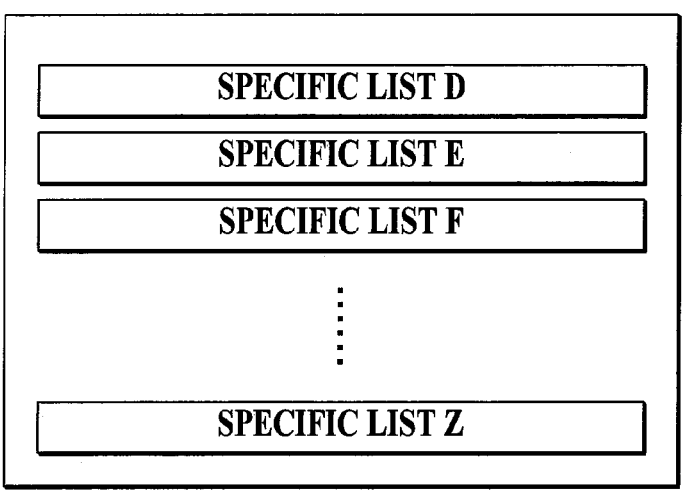
FIG. 3C is a diagram showing an example of a specific list selecting screen.

An example of the contents list display screen, the DMP selecting screen and the specific list selecting screen is shown in FIGS. 3A, 3B and 3C.

Moreover, for example, the display control program 13A is a program to make the CPU 11 realize the function of displaying the content of the specific list or the shared list selected by a user operating the remote controller R in the contents list display screen or the content of the specific list which is selected by a user operating the remote controller R in the specific list selecting screen and which is obtained by executing the after mentioned obtaining program 13B on the display unit 6.

For example, the contents list display screen lists and displays the specific list stored in the specific data file 9A of the DMP 2 (specific list A, specific list B and specific list C of FIG. 3A) and the shared list stored in the shared data file 9B (shared list A and shared list B of FIG. 3A) as shown in FIG. 3A. Further, an external list selecting icon for selecting the specific list of other DMP 2 connected via the network N is displayed on the contents list display screen.

Moreover, the CPU 11 displays the DMP selecting screen on the display unit 6 by executing the display control program 13A when the external list selecting icon on the contents list display screen is selected by a user operating the remote controller R.

For example, the DMP selecting screen lists and displays the DMP specific information for identifying the other DMP 2 connected with the DMP 2 via the network N as shown in FIG. 3B. Here, for example, the DMP specific information for identifying the DMP 2 is the name, the URL and the like of the DMP 2. The names of other DMP 2 connected with the DMP 2 via the network N are listed and displayed in FIG. 3B (DMP-A, DMP-B, DMP-C, ... DMP-Z of FIG. 3B).

Then, the CPU 11 displays the specific list selecting screen in which the icon or the like for specifying the specific information of the specific list obtained by the CPU 11 executing the after mentioned obtaining program 13B on the display unit 6 by the CPU 11 executing the display control program 13A when the desired DMP 2 is selected in the DMP selecting screen by a user operating the remote controller R.

For example, the specific list selecting screen lists and displays the icons (specific list D, specific list E, specific list F, ... specific list Z of FIG. 3C) or the like to specify the specific information of the specific list stored in the specific data file 9A of the DMP 2 selected in the DMP selecting screen as shown in FIG. 3C.

Then, the desired specific list can be selected in the specific list selecting screen by a user operating the remote controller R.

For example, the obtaining program 13B is a program to make the CPU 11 realize the function of obtaining the specific list stored in the specific data file 9A of other DMP 2 connected with the DMP 2 via the network N. More particularly, for example, the obtaining program 13B is a program to make the CPU 11 realize the function of obtaining the specific list selected by a user operating the remote controller R in the specific list selecting screen from the DMP 2 which is selected in the DMP selecting screen.

Moreover, for example, the obtaining program 13B is a program to make the CPU 11 realize the function of obtaining the specific information to identify the specific list stored in the specific data file 9A of the selected DMP 2 when any one of the DMP 2 is selected by a user operating the remote controller R in the DMP selecting screen. Here, for example, the specific information for identifying the specific list is the name, the URL and the like of the specific list.

The CPU 11 functions as an obtaining unit by executing the obtaining program 13B.

For example, the editing program 13C is a program to make the CPU 11 realize the function of carrying out the editing process for the specific list stored in the specific data file 9A, the shared list stored in the shared data file 9B and the specific list of the other DMP 2 obtained by the CPU 11 executing the obtaining program 13B.

Particularly, for example, the editing program 13C is a program to make the CPU 11 realize the function of editing the content of the specific list or the shared list according to the editing operation signal input by a user operating the remote controller R when the specific list or the shared list is selected by a user operating the remote controller R in the contents list selecting screen and the content of the specific list or the shared list is displayed on the display unit 6 or when the specific list is selected by a user operating the remote controller R in the specific list selecting screen and the content of the specific list is displayed on the display unit 6.

Here, for example, the editing process is a process in which the list item of the contents list is added/deleted, a process in which the list item of the contents list and the list item of other contents list are combined and the like.

The CPU 11 functions as an editing unit by executing the editing program 13C.

For example, the storage control program 13D is a program to make the CPU 11 realize the function of storing the specific list of the other DMP 2 obtained by the CPU 11 executing the obtaining program 13B in the specific data file 9A.

Particularly, for example, the storage control program 13D is a program to make the CPU 11 realize the function of storing the specific list in the shared data file 9B when it is determined whether the specific list of the other DMP 2 obtained by the CPU 11 executing the obtaining program 13B is to be stored as the shared list or not and when it is determined that the specific list is to be stored as a shared list, and the function of storing the specific list in the specific data file 9A when it is determined that the specific list it not to be stored as a shared list.

Moreover, for example, the storage control program 13D is a program to make the CPU 11 realize the function of storing the specific list in the shared data file 9B as a new shared list when it is determined whether the specific list or the shared list which is selected by a user operating the remote controller R in the contents list display screen is to be stored as a shared list or a specific list or not and when it is determined that the selected specific list or the selected shared list is to be stored as a shared list, and the function of storing the shared list in the specific data file 9A as a new specific list when it is determined that the selected specific list or the selected shared list is to be stored as a specific list.

Moreover, for example, the storage control program 13D is a program to make the CPU 11 realize the function of storing the specific list or the shared list in which the editing process is carried out in the shared data file 9B when it is determined whether the specific list or the shared list in which the editing process is carried out is to be stored as a shared list or not by the CPU 11 executing the editing program 13C and when it is determined that the specific list or the shared list in which the editing process is carried out is to be stored as a shared list, and a function of storing the specific list or the shared list in which the editing process is carried out in the specific data file 9A when it is determined that the specific list or the shared list in which the editing process is carried out is not to be stored as a shared list.

The CPU 11 functions as a storage control unit by executing the storage control program 13D.

For example, the updating program 13E is a program to make the CPU 11 realize the function of transmitting the specific list or the shared list in which the editing process is carried out to the other DMP 2 connected via the network N as an update list when the specific list or the shared list in which the editing process is carried out is stored in the shared data file 9B by the CPU 11 executing the storage control program 13D.

Moreover, for example, the updating program 13E is a program to make the CPU 11 realize the function of updating the shared data file 9B based on the update list when the update list is received from the other DMP 2 connected via the network N.

Particularly, for example, the updating program 13E is a program to make the CPU 11 realize the function of storing the update list in the shared data file 9B as a new shared list when it is determined whether the shared list having the same name as the update list exist or not by referring to the shared data file 9B in a case where the update list is received from the other DMP 2 connected via the network N and when it is determined that the shared list having the same name does not exist, and a function of updating by overwriting the shared list having the same name as the update list by the update list when it is determined that the shared list having the same name exist.

The CPU 11 functions as an updating unit by executing the updating program 13E.

Figure 4:
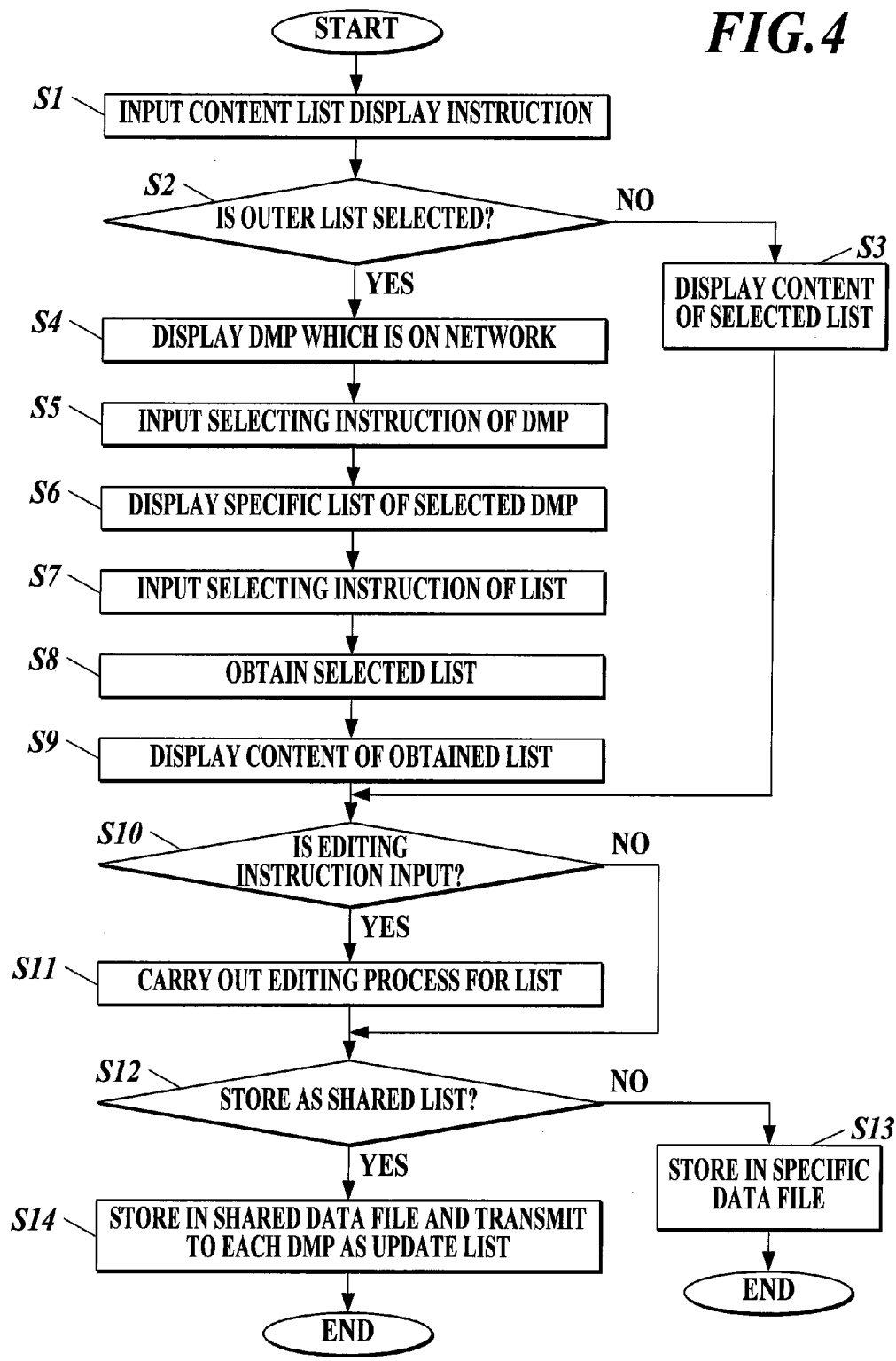
FIG. 4 is a flowchart to explain an example of a generating/editing operation of the contents list in the DMP of the network system according to the present invention.

Next, the generating/editing operation of the contents list of the DMP 2 of the network system 100 according to the embodiment having the above described structure will be described with reference to the flowchart shown in FIG. 4.

First, when the operation signal for displaying the contents list is input from the remote controller R, the CPU 11 displays the contents list display screen on the display unit 6 by the CPU 11 executing the display control program 13A (step S1).

Next, the CPU 11 determines whether the operation signal for selecting the external list is input from the remote controller R or not in the contents list display screen (step S2).

When the operation signal for selecting any one of the contents list is input from the remote controller R in the contents list display screen and when the CPU 11 determines that the operation signal for selecting the external list is not input in step S2 (step S2; No), the CPU 11 displays the content of the selected contents list on the display unit 6 by the CPU 11 executing the display control program 13A (step S3), and the process proceeds to step S10.

When the CPU 11 determines that the operation signal for selecting the external list is input from the remote controller R in the contents list display screen in step S2 (step S2; Yes), the CPU 11 displays the DMP selecting screen on the display unit 6 by the CPU 11 executing the display control program 13A (step S4).

Next, when the operation signal for selecting any one of the DMP 2 is input from the remote controller R in the DMP selecting screen (step S5), the CPU 11 obtains the specific information of the specific list stored in the specific data file 9A of the selected DMP 2 by the CPU 11 executing the obtaining program 13B, and displays the specific list selecting screen on the display unit 6 along with the execution of the display control program 13A by the CPU 11 (step S6).

Next, when the operation signal for selecting any one of the specific list is input from the remote controller R in the specific list selecting screen (step S7), the CPU 11 obtains the selected specific list by executing the obtaining program 13B (step S8).

Next, the CPU 11 displays the content of the specific list obtained in step S8 on the display unit 6 by the CPU 11 executing the display control program 13A (step S9).

Next, the CPU 11 determines whether the operation signal for editing the content of the contents list which is displayed on the display unit 6 is input from the remote controller R or not (step S10).

When the CPU 11 determines that the operation signal for editing the content of the contents list is not input from the remote controller R in step S10 (step S10; No), the process proceeds to step S12.

When the CPU 11 determines that the operation signal for editing the content of the contents list is input from the remote controller R in step S10 (step S10; Yes), the CPU 11 carries out the editing process for the contents list according to the input operation signal (step S11).

Next, the CPU 11 determines whether the contents list in which the content is displayed on the display unit 6 in step S3 or in step S9 and in which the editing process is carried out in step S10 or is not carried out in step S10 is to be stored as a shared list or not based on the operation signal input from the remote controller R by executing the storage control program 13D (step S12).

When the CPU 11 determines that the contents list is not to be stored as a shared list in step S12 (step S12; No), the CPU 11 stores the contents list in the specific data file 9A (step S13), and the process is finished.

When the CPU 11 determines to store the contents list as a shared list in step S12 (step S12; Yes), the CPU 11 stores the contents list in the shared data file 9B and transmits the contents list to the other DMP 2 connected via the network N as an update list (step S14), and the process is finished.

Figure 5:
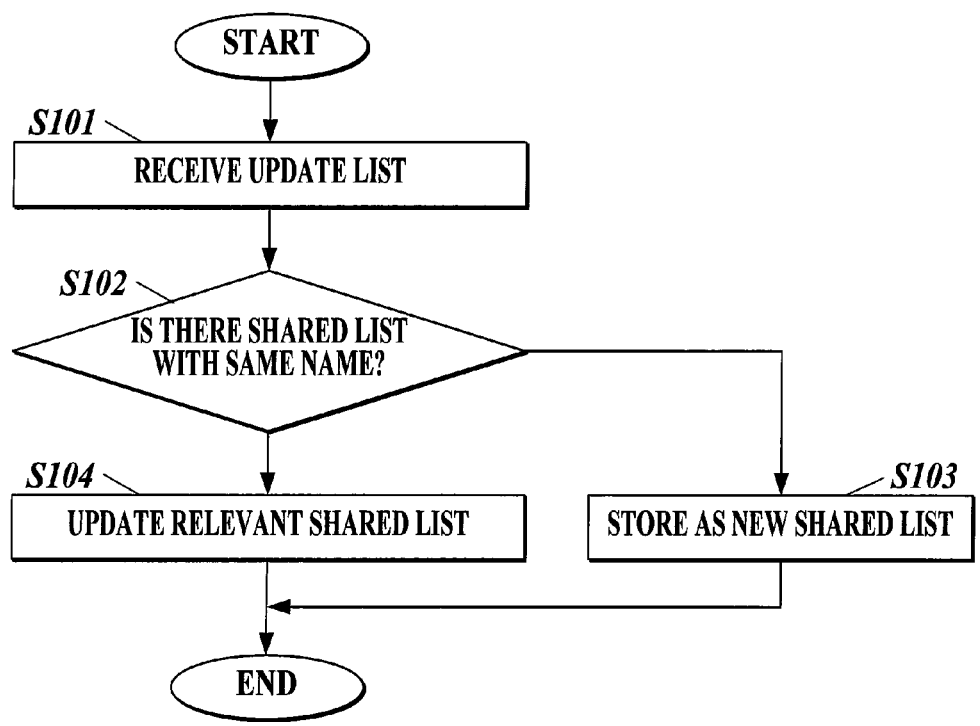
FIG. 5 is a flowchart showing an example of an updating operation of the contents list in the DMP of the network system according to the present invention.

Next, the update operation of the contents list in the DMP 2 of the network system 100 according to the embodiment will be described with reference to the flowchart shown in FIG. 5.

First, when the update list which is transmitted from the other DMP 2 via the network N is received (step S101), the CPU 11 determines whether the shared list having the same name as the update list exists or not by referring to the shared data file 9B by the CPU 11 executing the updating program 13E (step S102).

When the CPU 11 determines that the shared list having the same name as the update list does not exist in step S102 (step S102; No), the CPU 11 stores the update list in the shared data file 9B as a new shared list (step S103), and the process is finished.

When the CPU 11 determines that the shared list having the same name as the update list exists in step S102 (step S102; Yes), the CPU 11 updates the shared list by overwriting the shared list having the same name as the update list by the update list (step S104), and the process is finished.

According to the above described network system 100 and the DMP 2 (replay apparatus), the specific list which is a predetermined contents list specific to the DMP 2 is stored by the specific data file 9A in the DMP 2, and the shared list which is a predetermined contents list which can be shared among the entire DMP 2 connected via the network N is stored by the shared data file 9B. Therefore, the specific list and the shared list can be arbitrarily administered separately, and the contents list according to a user's various purposes of utilization can be generated.

Moreover, the specific list stored in the specific data file 9A of the other DMP 2 connected via the network N is obtained by the CPU 11 executing the obtaining program 13B, and the specific list obtained by the CPU 11 executing the obtaining program 13B is stored in the specific data file 9A by the CPU 11 executing the storage control program 13D. Therefore, the one DMP 2 can obtain and use the specific list generated in the other DMP 2 connected via the network N. Thus, the contents list (for example, the favorite list) can be generated more efficiently.

Moreover, a predetermine editing process is carried out for the shared list which is stored by the shared data file 9B by the CPU 11 executing the editing program 13C, and the edited shared list is transmitted to the other DMP 2 connected via the network N as an update list and the update list is received from the other DMP 2 connected via the network N to update the shared data file 9B based on the update list when the shared list is edited by the CPU 11 executing the editing program 13C by the CPU executing the updating program 13E. Therefore, the shared list of all the other DMP 2 connected via the network N can be updated only by updating the shared list of one DMP 2. Thus, the shared list can be updated efficiently.

Here, the update list is directly transmitted to the other DNP 2 from the one DMP 2. However, it may be structured so that the update list can be once transmitted from the one DMP 2 to the DMS 1 and then the update list is transmitted from the DMS 1 to the other DMP 2. By having such a structure, the update list can be re-transmitted to the other DMP 2 from the DMS 1 after the power recovery even in a case where the update list cannot be transmitted due to a reason such as the power of the other DMP 2 connected via the network N is turned off or the like. Thus, the shared list can be updated more surely.

Moreover, it may be structured so that the specific data file 9A is to be stored in the sub-microcomputer or the like which is activated even in a stand-by status. By having such a structure, the one DMP 2 can obtain the specific list of the other DMP 2 even when the other DMP 2 connected via the network N is in a standby status.

According to a first aspect of the preferred embodiment of the present invention, there if provided a network system comprising a server to store a content and a plurality of replay apparatuses to receive the content transmitted from the server, the replay apparatuses being connected with the server via a network, and the replay apparatus comprises a specific list storage unit to store a specific list which is a predetermined content list specific to the replay apparatus, a shared list storage unit to store a shared list which is a predetermined content which is shared among all of the replay apparatuses which are connected via the network, an obtaining unit to obtain the specific list stored in a specific list storage unit of another replay apparatus connected via the network, a storage control unit to store the specific list obtained by the obtaining unit in the specific list storage unit of the replay apparatus, an editing unit to carry out a predetermined editing process for the shared list stored by the shared list storage unit, and an updating unit to update the shared list storage unit based on an update list by transmitting the shared list which is edited to the another replay apparatus connected via the network as the update list and by receiving the update list from the another replay apparatus connected via the network when the shared list is edited by the editing unit.

In accordance with the first aspect of the preferred embodiment of the present invention, in the replay apparatus, the specific list which is a predetermined contents list specific to the replay apparatus is stored by the specific list storage unit, and the shared list which is a predetermined contents list which can be shared among the entire replay apparatuses connected via the network is stored by the shared list storage unit. Therefore, the specific list and the shared list can be arbitrarily administered separately, and the contents list according to a user's various purposes of utilization can be generated.

Moreover, the specific list stored in the specific list storage unit of the other replay apparatus connected via the network N is obtained by the obtaining unit, and the specific list obtained by the obtaining unit is stored in the specific list storage unit by the storage control unit. Therefore, the one replay apparatus can obtain and use the specific list generated in the other replay apparatus connected via the network. Thus, the contents list (for example, the favorite list) can be generated more efficiently.

Furthermore, a predetermined editing process is carried out for the shared list stored by the shared list storage unit by the editing unit, and the edited shared list is transmitted to the other replay apparatuses connected via the network as an update list and the update list is received from the other replay apparatuses connected via the network to update the shared list storage unit based on the update list by the updating unit when the shared list is edited by the editing unit. Therefore, all the other replay apparatuses which are connected via the network can be updated only by updating the shared list of one replay apparatus. Thus, the shared list can be updated efficiently.

According to a second aspect of the preferred embodiment of the present invention, there is provided a replay apparatus which is connected with a server storing a content via a network and which receives the content transmitted from the server comprising a list storage unit to store a predetermined content list, an obtaining unit to obtain the content list stored in the list storage unit of another replay apparatus connected via the network, and a storage control unit to store the content list obtained by the obtaining unit in the list storage unit.

In accordance with the second aspect of the preferred embodiment of the present invention, a predetermined contents list is stored by the list storage unit, the contents list stored in the list storage unit of the other replay apparatuses connected via the network are obtained by the obtaining unit, and the contents list obtained by the obtaining unit are stored in the list storage unit by the storage control unit. Therefore, one replay apparatus can obtain and use the contents list generated in the other replay apparatus connected via the network. Thus, the contents list (for example, the favorite list) can be generated more efficiently.

According to a third aspect of the preferred embodiment of the present invention, there is provided a network system comprising a server to store a content and a plurality of replay apparatuses to receive the content transmitted from the server, the replay apparatuses being connected with the server via a network, and the replay apparatus comprises a list storage unit to store a predetermined content list, an obtaining unit to obtain the content list stored in the list storage unit of another replay apparatus connected via the network, and a storage control unit to store the content list obtained by the obtaining unit in the list storage unit.

In accordance with the third aspect of the preferred embodiment of the present invention, in the replay apparatus, a predetermined contents list is stores by the list storage unit, the contents list stored in the list storage unit of the other replay apparatuses connected via the network are obtained by the obtaining unit, and the contents lists obtained by the obtaining unit are stored in the list storage unit by the storage control unit. Therefore, one replay apparatus can obtain and use the contents lists generated in the other replay apparatuses connected via the network. Thus, the contents list (for example, the favorite list) can be generated more efficiently.

Preferably, the replay apparatus further comprises an editing unit to carry out a predetermined editing process for the content list stored by the list storage unit.

In the preferred embodiment of the present invention, the same effect is obtained. Particularly, a predetermined editing process is carried out for the contents list stored by the list storage unit by the editing unit in the replay apparatus. Therefore, the contents list obtained from the other replay apparatuses connected via the network or the generated contents list which is generated can be edited, and the replay apparatus is convenient to use.

Preferably, the replay apparatus further comprises an updating unit to update the list storage unit based on an update list by transmitting the content list which is edited to the another replay apparatus connected via the network as the update list and by receiving the update list transmitted from the another replay apparatus connected via the network when the content list is edited by the editing unit.

In the preferred embodiment of the present invention, the same effect is obtained. Particularly, in the replay apparatus, the edited contents list is transmitted to the other replay apparatuses connected via the network as an update list by the updating unit when the contents list is edited by the editing unit, and the update list transmitted from the other replay apparatus connected via the network is received to update the list storage unit based on the update list. Therefore, the contents list of all the other replay apparatuses connected via the network can be updated only by updating the contents list of one replay apparatus, and the contents list can be updated efficiently.

The entire disclosure of Japanese Patent Application No. 2006-352452 filed on Dec. 27, 2006 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A network system, comprising: a server device to store one or a plurality of contents; and
a plurality of replay devices, each of which receives respective contents which are desired by a user, are specific to the replay device, and are transmitted from the server device, the replay devices being connected with the server device via a network,
wherein each of the replay devices comprises:
a specific list storage unit to store a first specific list which is a content list specific to the replay device, the content list including information of the respective contents,
an individual shared list storage unit to store a shared list which is a content list which is shared among the plurality of replay devices,
an obtaining unit to obtain a second specific list stored in the specific list storage unit of another of the plurality of replay devices, wherein the obtaining unit is configured to obtain the second specific list directly from the other replay device via the network,
a storage control unit to store the second specific list obtained by the obtaining unit in the specific list storage unit of the replay device,
an editing unit to carry out an editing process of the shared list which is stored in the shared list storage unit, and
an updating unit to transmit the edited shared list to the other replay devices as a first update list, or to update the shared list storage unit based on a second update list received from another replay device, wherein:
if the shared list stored in the shared list storage unit of the replay device is edited by the replay device, the corresponding shared lists stored in the respective shared list storage units of the other replay devices are updated, and
if the first specific list or the second specific list stored in the specific list storage unit of the replay device is edited by the replay device, the other replay devices are not updated,
the updating unit transmits the first update list to the server device, and
the updating unit receives the second update list from the server device if the second update list cannot be received directly from the other replay device.

2. A replay device which is connected via a network with a server device storing one or a plurality of contents, and which receives contents which are desired by a user and transmitted from the server device, the replay device comprising:
a specific list storage unit to store a first specific list which is a content list specific to the replay device, the content list including information of the respective contents;
an individual shared list storage unit to store a shared list which is a content list which is shared among a plurality of replay devices, each of which includes a respective specific list storage unit and a respective shared list storage unit, and each of which is connected with the server device via the network;
an obtaining unit to obtain a second specific list stored in the specific list storage unit of another of the plurality of replay devices, wherein the obtaining unit is configured to obtain the second specific list directly from the other replay device via the network;
a storage control unit to store the second specific list obtained by the obtaining unit in the specific list storage unit; and
an updating unit to transmit a first edited shared list as a first update list to the server device, and to receive a second edited shared list as a second update list from the server device if the second update list cannot be received directly from another of the plurality of replay devices, wherein:
if the shared list stored in the shared list storage unit of the replay device is edited by the replay device, the corresponding shared lists stored in the respective shared list storage units of the other replay devices are updated, and
if the first specific list or the second specific list stored in the specific list storage unit of the replay device is edited by the replay device, the other replay devices are not updated.

3. A network system, comprising: a server device to store one or a plurality of contents; and a plurality of replay devices, each of which receives respective contents which are desired by a user, are specific to the replay device, and are transmitted from the server device, the replay devices being connected with the server device via a network,
wherein each of the replay devices comprises:
a specific list storage unit to store a first specific list which is a content list specific to the replay device, the content list including
information of the respective contents,
an individual shared list storage unit to store a shared list which is a content list which is shared among the plurality of replay devices;
an obtaining unit to obtain a second specific list stored in the specific list storage unit of another of the plurality of replay devices, wherein the obtaining unit is configured to obtain the second specific list directly from the other replay device via the network,
a storage control unit to store the second specific list obtained by the obtaining unit in the specific list storage unit,
an editing unit to carry out an editing process of the shared list stored in the shared list storage unit, and
an updating unit to transmit a first edited shared list as a first update list to the server device, and to receive a second edited shared list as a second update list from the server device if the second update list cannot be received directly from another of the plurality of replay devices, wherein:
if the shared list stored in the shared list storage unit of the replay device is edited by the replay device, the corresponding shared lists stored in the respective shared list storage units of the other replay devices are updated, and if the first specific list or the second specific list stored in the specific list storage unit of the replay device is edited by the replay device, the other replay devices are not updated.

4. The network system as claimed in claim 3, wherein the updating unit transmits the first update list to the other replay devices, or updates the shared list storage unit based on the second update list received from the other replay device.

* * * * *